UNITED STATES PATENT OFFICE.

ADOLPHE CHALAS, OF PHILADELPHIA, PENNSYLVANIA.

PROCESS OF REDUCING NICKEL HYDROSILICATE ORES.

959,460.  Specification of Letters Patent.  Patented May 31, 1910.

No Drawing.  Application filed September 20, 1909.  Serial No. 518,568.

*To all whom it may concern:*

Be it known that I, ADOLPHE CHALAS, a citizen of the Republic of France, residing at Philadelphia, in the county of Philadelphia and State of Pennsylvania, have invented certain new and useful Improvements in Processes of Reducing Nickel Hydrosilicate Ores, of which the following is a specification.

The invention is a process of reducing silicious nickel ores, such as garnierite, which contains nickel as a hydrosilicate together with a large proportion of magnesia. The other reducible metals contained in such ores are iron and a very small proportion of cobalt, manganese and chromium, while the other refractory gangue materials, besides silica and magnesia, are very small proportions of alumina and lime. The hydrosilicate ores are characterized by their high combined-water contents, averaging about ten per cent. by weight. They very easily absorb water, being of a clayey texture, and always retain a large amount of hygroscopic water, averaging over twenty per cent. by weight.

The present process essentially comprises three steps, to wit:—first, the briqueting of a mixture of the specified nickel ores, serving as a binding material, with fine ores of high iron contents, such as magnetite sands and concentrates, flue-dust, iron scale, purple ore, or the leached residues of roasted nickel-copper pyrites; second, the reduction of these briquets in an ordinary blast furnace, with a sufficient quantity of lime to give a basic slag, producing a nickeliferous pig-iron which is largely separated from the slag by gravitation; third, the magnetic separation of metallic granules from the slag when it has become viscous by reason of a high magnesia content, the slag being first chilled and crushed.

A large proportion of the crude nickel hydrosilicate ore is naturally pulverulent, and the lumps therein are crushed into fine dust. In the first stage of the process, the finely-divided ore is preferably mixed with a small proportion of hydraulic lime, which, uniting with the hygroscopic water contained in the ore, greatly increases the binding properties of the ore and furthermore has an important action on the scorification of the charge in the furnace. The fine iron ore to be briqueted is also added and mixed, in the right proportion as to obtain the required amount of nickel in the pig-iron product, taking into consideration the iron contents of the nickel ore as well as the possible nickel contents of the iron ore, if for instance roasted nickeliferous pyrite residues are used. The mixture is briqueted by simple pressure.

In the second stage of the process, the briquets are charged into a blast furnace, together with the necessary quantity of limestone to insure a basic run and thus avoid the absorption of sulfur from the coke by the reduced nickel. In order to modify the composition of the slag or nickeliferous alloy, suitable additions of fluxes and ores may be made. For example, manganese ore may be added to the furnace charge, to secure the better elimination of sulfur. During reduction, the vaporization of the large quantity of hygroscopic water retained by the nickel ore, in the upper part of the furnace, permits a very hot and rapid run of the furnace without any risk of the zone of fusion rising above its normal level. The dissociation of the combined water from the hydrosilicate of nickel and magnesia, which takes place lower down, gives to the mass a particularly porous texture, very favorable to the access of the reducing gases. It is very important that reduction should precede scorification. The admixed lime combines with the silica to give a basic slag of relatively high melting point. The hydrosilicate in the ore, beginning to soften at a comparatively low temperature, would otherwise fill the pores of the briqueted mass and hinder reduction. When the materials reach the fusion zone, stratification of the molten nickeliferous pig-iron and slag takes place in the ordinary way, provided the percentage of magnesia in the slag does not render it too viscous. In the latter case, which occurs whenever the proportion of nickel ore in the mixture has to be raised in order to increase the nickel contents of the alloy, the basic and highly magnesian slag carries away some metallic granules which have to be recovered on account of their nickel contents.

The third stage of the process consists in chilling the molten slag by running it into water, crushing it, and passing it with water through a magnetic separator, by which practically every particle of nickel-iron alloy is recovered. The residual slag contains practically no nickel, owing to the lack of affinity of this metal for anhydrous silica, and to the fact that the iron, being more oxidizable than nickel, protects the latter from oxidation and scorification.

The nickeliferous pig-iron produced by this process contains very little sulfur, phosphorus and silicon. It is treated in the ordinary way, i. e., in the converter, open-hearth or electric furnace, for further desulfurization and dephosphorization, if desired, as well as for the removal of carbon, silicon, manganese and chromium, all of which are more oxidizable than the remaining nickel, cobalt and iron. Any suitable additions of deoxidizing or other metals or alloys are made to give the desired final product.

I claim:—

1. The process of reducing nickel hydrosilicate ores, which consists in briqueting a mixture of said ore, serving as a binding material, and finely-divided iron ore, and smelting the briquets with production of nickeliferous pig-iron.

2. The process of reducing nickel hydrosilicate ores, which consists in briqueting a mixture of said ore, serving as a binding material, and finely-divided iron ore, and smelting a charge of the briquets, fuel and limestone, with production of a basic slag and nickeliferous pig-iron low in sulfur and phosphorus.

3. The process of reducing nickel hydrosilicate ores, which consists in briqueting a mixture of said ore, serving as a binding material, and finely-divided iron ore, smelting a charge of the briquets, fuel and limestone, with production of a basic slag and nickeliferous pig-iron low in sulfur and phosphorus, separating the major portion of the pig-iron from the slag by gravitation, chilling the molten slag with water, crushing it, and magnetically separating the nickel-iron granules therefrom.

4. The process of reducing nickel hydrosilicate ores, which consists in briqueting a mixture of said ore, hydraulic lime, and finely-divided iron ore, and smelting the briquets with production of nickeliferous pig-iron.

In testimony whereof, I affix my signature in presence of two witnesses.

ADOLPHE CHALAS.

Witnesses:
H. F. LAVINOY,
J. W. HALE.